J. Vandercar,
Dish Pan,
No. 43,442. Patented July 5, 1864.
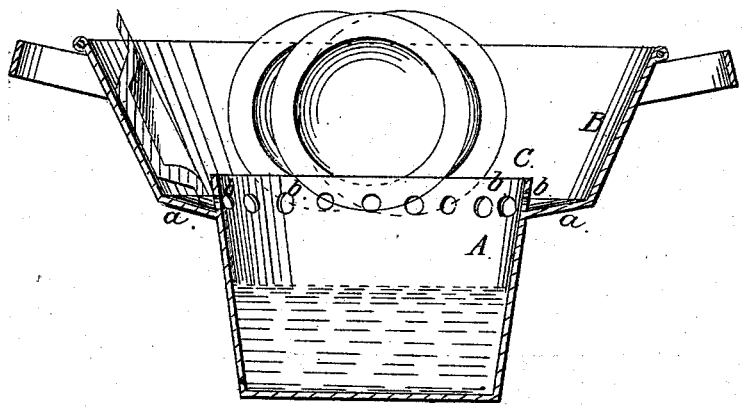
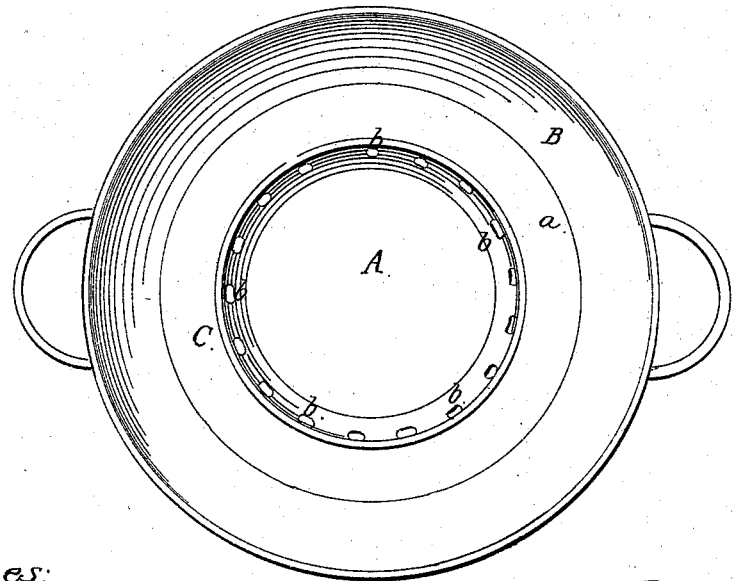
Witnesses:
Theo. Tusch
Wm. F. McNamara
Inventor:
John Vandercar

UNITED STATES PATENT OFFICE.

JOHN VANDERCAR, OF BROOKLYN, NEW YORK.

IMPROVED DISH-PAN.

Specification forming part of Letters Patent No. 43,442, dated July 5, 1864.

*To all whom it may concern:*

Be it known that I, JOHN VANDERCAR, of Brooklyn, in the county of Kings and State of New York, have invented a new and Improved Dish-Pan; and I do hereby declare that the following is a full, clear, and exact description thereof, which will enable others skilled in the art to make and use the same, reference being had to the accompanying drawings, forming part of this specification, in which—

Figure 1 is a vertical central section of my invention; Fig. 2, a horizontal section of the same.

Similar letters of reference indicate like parts.

This invention consists in the application to a dish-pan of a flanged rim, which communicates with the interior of the pan through holes in a circular projection rising above the bottom of said flanged rim in such a manner that the dishes, plates, &c., after they have been washed, can be placed on the flanged rim to drain and the water draining off from the same finds its way back into the pan.

A represents a dish-pan, made of tinned sheet-iron or any other suitable material in the ordinary shape and manner. From the top edge of this pan rises the flanged rim B, which is made flaring, as clearly shown in Fig. 1 of the drawings, and which may be made with an inclined bottom, *a*, or the flange B may be secured directly to the outside of the pan, running off therefrom in an inclined direction, as may be most convenient. The top edge of the body of the pan A extends above the bottom or bottom edge of the flange B, so as to form a circular projection, C, which retains the dishes, plates, &c., and prevents them from sliding back into the pan. This circular projection is perforated with a series of holes, *b*, as clearly shown in the drawings In order to wash dishes, &c., in my pan the body A of the same is filled with water in the usual manner, and after the dishes, plates, &c., have been washed and rinsed they are placed on the flanged rim B, as indicated in red outlines in Fig. 1. In this position said dishes, plates, &c., drain, and the water draining off from the same runs through the holes *b* in the circular projection C back into the body of the pan.

By the aid of my pan the operation of washing dishes can be performed without spilling any water on the table. The whole operation is finished within the pan, and the plates, dishes, &c., have not to be removed therefrom until they are drained off and ready to be dried.

It must be remarked that, instead of the circular perforated projection, simple stops may be applied, but in practice the perforated projection will be preferable.

Having thus described my invention, I claim as new and desire to secure by Letters Patent—

A dish-pan, A, with a flanged rim, B, and circular perforated projection C, or its equivalent, constructed and operating in the manner and for the purpose substantially as herein shown and described.

JOHN VANDERCAR.

Witnesses:
THEO. TUSCH,
M. M. LIVINGSTON.